United States Patent
Lovelace

(10) Patent No.: US 7,469,500 B2
(45) Date of Patent: Dec. 30, 2008

(54) NEMATODE EXTERMINATION IN PLACE USING HEAT BLANKETS

(76) Inventor: Reginald B. Lovelace, 5749 Tamarack Dr., Orlando, FL (US) 32819

( * ) Notice: Subject to any disclaimer, the term of this patent is extended or adjusted under 35 U.S.C. 154(b) by 293 days.

(21) Appl. No.: 11/312,325

(22) Filed: Dec. 20, 2005

(65) Prior Publication Data

US 2006/0242900 A1    Nov. 2, 2006

Related U.S. Application Data

(60) Provisional application No. 60/641,553, filed on Jan. 5, 2005.

(51) Int. Cl.
*A01M 1/20* (2006.01)
*A01M 17/00* (2006.01)

(52) U.S. Cl. .................. 43/132.1; 43/124; 47/1.42; 219/486

(58) Field of Classification Search .............. 43/124, 43/132.1; 47/1.42; 219/483, 486
See application file for complete search history.

(56) References Cited

U.S. PATENT DOCUMENTS

| | | | |
|---|---|---|---|
| 1,021,530 A * | 3/1912 | Johnson | 43/130 |
| 1,444,794 A | 2/1923 | Kernan | |
| 1,800,150 A * | 4/1931 | Musgrave et al. | 165/56 |
| 2,350,721 A * | 6/1944 | Brown | 47/1.42 |
| 2,469,963 A * | 5/1949 | Grosjean et al. | 43/124 |
| 2,947,109 A * | 8/1960 | Davis, Sr. et al. | 47/1.42 |
| 2,966,128 A | 12/1960 | Toulmin, Jr. | |
| 3,858,028 A * | 12/1974 | Kerr | 219/527 |
| 3,945,332 A | 3/1976 | Wirsbinski | |
| 4,009,666 A | 3/1977 | Russell et al. | |
| 4,034,739 A | 7/1977 | Boekelman | |
| 4,098,019 A * | 7/1978 | Strong | 47/1.42 |
| 4,132,262 A * | 1/1979 | Wibell | 219/212 |
| 4,161,193 A * | 7/1979 | Freychet et al. | 47/1.42 |
| 4,404,460 A * | 9/1983 | Kerr | 219/529 |
| 4,420,901 A | 12/1983 | Clarke | |
| 4,485,296 A * | 11/1984 | Ueda et al. | 219/212 |
| 4,549,074 A * | 10/1985 | Matsuo | 219/212 |
| 4,597,217 A * | 7/1986 | Narita | 43/124 |
| 4,637,161 A * | 1/1987 | Turner | 43/132.1 |
| 4,640,044 A * | 2/1987 | Varnon | 43/132.1 |
| 4,661,689 A * | 4/1987 | Harrison | 219/528 |
| 4,795,886 A * | 1/1989 | Carter, Jr. | 219/494 |

(Continued)

FOREIGN PATENT DOCUMENTS

JP     03039163 A  *  2/1991

(Continued)

*Primary Examiner*—Darren W Ark
(74) *Attorney, Agent, or Firm*—John V. Stewart

(57) ABSTRACT

A system and method for nematode extermination in lawns using an array of insulated heat blankets (2) placed on the lawn, and energized in a controlled sequence to raise the soil temperature to an effective degree and depth to exterminate nematodes. An electric current controller such as a programmable logic controller (PLC) activates a first subset of the blankets (2) until they reach an upper setpoint temperature, then maintains the blanket temperature within a desired range with reduced current while activating additional blankets. The heat penetrates the soil over a period of about 20 to 50 hours to raise the temperature to at least about 52° C. (125° F.) at a sufficient depth such as at least 12 cm (4.7 inches) to kill at least most nematodes.

2 Claims, 4 Drawing Sheets

U.S. PATENT DOCUMENTS

| | | | |
|---|---|---|---|
| 4,798,936 A * | 1/1989 | Johnson, Sr. | 219/212 |
| 4,817,329 A * | 4/1989 | Forbes | 43/132.1 |
| 4,885,456 A * | 12/1989 | Tanaka et al. | 219/497 |
| 4,953,320 A * | 9/1990 | Nelson | 43/132.1 |
| 4,961,283 A * | 10/1990 | Forbes | 43/132.1 |
| 4,984,594 A * | 1/1991 | Vinegar et al. | 134/21 |
| 5,023,430 A * | 6/1991 | Brekkestran et al. | 219/483 |
| 5,032,705 A * | 7/1991 | Batcheller et al. | 219/529 |
| 5,058,313 A * | 10/1991 | Tallon | 43/132.1 |
| 5,105,067 A * | 4/1992 | Brekkestran et al. | 219/486 |
| 5,193,934 A * | 3/1993 | Johnson et al. | 405/128.35 |
| 5,203,108 A * | 4/1993 | Washburn, Jr. | 43/132.1 |
| 5,221,827 A * | 6/1993 | Marsden et al. | 219/213 |
| 5,229,583 A * | 7/1993 | van Egmond et al. | 219/549 |
| 5,233,164 A * | 8/1993 | Dicks et al. | 219/528 |
| 5,259,327 A * | 11/1993 | Thompson et al. | 47/1.42 |
| 5,271,470 A | 12/1993 | King et al. | |
| 5,430,970 A | 7/1995 | Thompson et al. | |
| 5,442,876 A * | 8/1995 | Pedersen | 43/132.1 |
| 5,553,414 A | 9/1996 | Chapman et al. | |
| 5,566,627 A | 10/1996 | Pryor | |
| 5,622,123 A | 4/1997 | Rajamannan | |
| 5,622,641 A * | 4/1997 | Kim et al. | 219/528 |
| 5,674,424 A * | 10/1997 | Iben et al. | 219/549 |
| 5,717,189 A * | 2/1998 | Goetz et al. | 219/483 |
| 5,792,419 A * | 8/1998 | Williamson et al. | 43/124 |
| 5,847,367 A * | 12/1998 | Hancock et al. | 219/505 |
| 5,848,492 A | 12/1998 | Brown | |
| RE36,222 E * | 6/1999 | O'Ham | 47/1.42 |
| 5,948,303 A * | 9/1999 | Larson | 219/486 |
| 6,051,811 A * | 4/2000 | Hardison | 219/213 |
| 6,079,170 A * | 6/2000 | Slebos | 52/220.1 |
| 6,141,901 A * | 11/2000 | Johnson et al. | 43/132.1 |
| 6,171,561 B1 * | 1/2001 | Williamson et al. | 43/124 |
| 6,180,929 B1 * | 1/2001 | Pearce | 219/528 |
| 6,319,463 B1 | 11/2001 | Celli | |
| 6,327,812 B1 * | 12/2001 | Hedman et al. | 43/132.1 |
| 6,399,367 B1 * | 6/2002 | Pollock et al. | 47/1.42 |
| 6,505,437 B1 | 1/2003 | Johnstone et al. | |
| 6,588,140 B1 * | 7/2003 | Johnson et al. | 43/132.1 |
| 6,612,067 B2 * | 9/2003 | Topp | 43/124 |
| 6,664,512 B2 * | 12/2003 | Horey et al. | 219/212 |
| 6,678,994 B2 * | 1/2004 | Topp | 43/124 |
| 6,730,887 B2 * | 5/2004 | Horey et al. | 219/497 |
| 6,770,848 B2 * | 8/2004 | Haas et al. | 219/212 |
| 6,770,853 B2 * | 8/2004 | Krieger et al. | 219/497 |
| 6,888,108 B2 * | 5/2005 | Carr | 219/483 |
| 6,892,491 B2 * | 5/2005 | Hedman | 43/132.1 |
| 6,911,628 B1 * | 6/2005 | Hirayama | 219/486 |
| 6,913,571 B2 * | 7/2005 | Severns | 219/497 |
| 6,943,327 B2 * | 9/2005 | Fabregas et al. | 219/483 |
| 6,951,998 B2 * | 10/2005 | Nanno et al. | 219/494 |
| 6,993,867 B2 * | 2/2006 | Toyota | 43/124 |
| 6,998,584 B1 * | 2/2006 | Luo | 219/486 |
| 7,022,950 B2 * | 4/2006 | Haas et al. | 219/528 |
| 7,076,915 B1 * | 7/2006 | Brooks et al. | 43/132.1 |
| 7,301,129 B1 * | 11/2007 | Yabe et al. | 219/505 |
| 2003/0127448 A1 * | 7/2003 | Jirmann | 219/486 |
| 2003/0234247 A1 * | 12/2003 | Stern | 219/212 |
| 2004/0026405 A1 * | 2/2004 | Alvite et al. | 219/486 |
| 2004/0069761 A1 * | 4/2004 | Carr et al. | 219/212 |
| 2004/0069769 A1 * | 4/2004 | Carr | 219/497 |
| 2004/0099654 A1 * | 5/2004 | Pais | 219/486 |
| 2005/0109752 A1 * | 5/2005 | Merk et al. | 219/212 |
| 2005/0167418 A1 * | 8/2005 | Fabregas et al. | 219/494 |
| 2006/0049170 A1 * | 3/2006 | Luo | 219/486 |
| 2006/0138117 A1 * | 6/2006 | Morgandi | 219/212 |
| 2006/0151456 A1 * | 7/2006 | Child et al. | 219/212 |
| 2006/0261055 A1 * | 11/2006 | Child et al. | 219/212 |
| 2007/0227061 A1 * | 10/2007 | Chang et al. | 43/132.1 |

FOREIGN PATENT DOCUMENTS

| | | | |
|---|---|---|---|
| JP | 08052200 A * | 2/1996 | |
| JP | 2001112395 A * | 4/2001 | |
| JP | 2003299432 A * | 10/2003 | |
| JP | 2004166586 A * | 6/2004 | |
| JP | 2004201534 A * | 7/2004 | |
| JP | 2004267105 A * | 9/2004 | |
| JP | 2005087168 A * | 4/2005 | |
| JP | 2005261387 A * | 9/2005 | |
| JP | 2007111003 A * | 5/2007 | |
| JP | 2007129963 A * | 5/2007 | |

* cited by examiner

NEMATODE EXTERMINATION IN PLACE USING HEAT BLANKETS

CROSS REFERENCE TO RELATED APPLICATIONS

This application claims the benefit of U.S. provisional patent application 60/641,553, filed Jan. 5, 2005.

BACKGROUND

1. Field of the Invention

This invention relates to extermination of undesirable organisms in soil, and particularly to nematode extermination in lawn soil by heating.

2. Background of the Invention

Nematode infestation of lawns has long been an intractable problem. Present pesticide chemicals that are environmentally acceptable are ineffective. Nematodes can live relatively deep in the soil, for example over 15 cm (6"), and thus cannot be easily reached with pest control measures.

Prior attempts to kill soil infestations of various types using heat generally require scooping a top layer of soil into a heating oven or onto a belt with a burner that cooks the soil to a sterilizing temperature while turning and breaking the soil for even heating. See for example U.S. Pat. No. 5,553,414. This is expensive in terms of both equipment and energy, and is totally disruptive. It is impractical for nematodes in lawns because it would destroy an in-ground sprinkler system and other underground utilities. It could not be used near trees or shrubs because it would either destroy the roots or be damaged and stopped by them. It is impractical due to the massive amount of soil that must be moved and processed to reach the lowest nematodes. The returned soil must be re-graded and tamped. Additionally, these types of soil lifting and cooking machines pose a fire hazard. They use high temperatures from fuel burners in order to heat the lifted soil fast enough to allow the machine to move along and finish the job in a reasonable time. The driver cannot sit in one spot for hours. Lifting the soil aerates it in the process facilitating ignition of organic materials such as humus, grass and twigs. Heating soil hotter than necessary destroys some beneficial soil components including organics. Thus, an improved nematode extermination method is needed.

SUMMARY

An ideal nematode extermination system would be effective, environmentally friendly, energy efficient, reasonably inexpensive, non-disruptive, usable where sprinkler systems are installed, and would not require a major investment in specialized heavy equipment. The present invention accomplishes these goals with an array of insulated heat blankets placed on the lawn, and energized in a controlled sequence with temperature sensors to raise the soil temperature to an effective degree and depth to exterminate nematodes and other vermin.

REFERENCE NUMERALS

Figure 1:
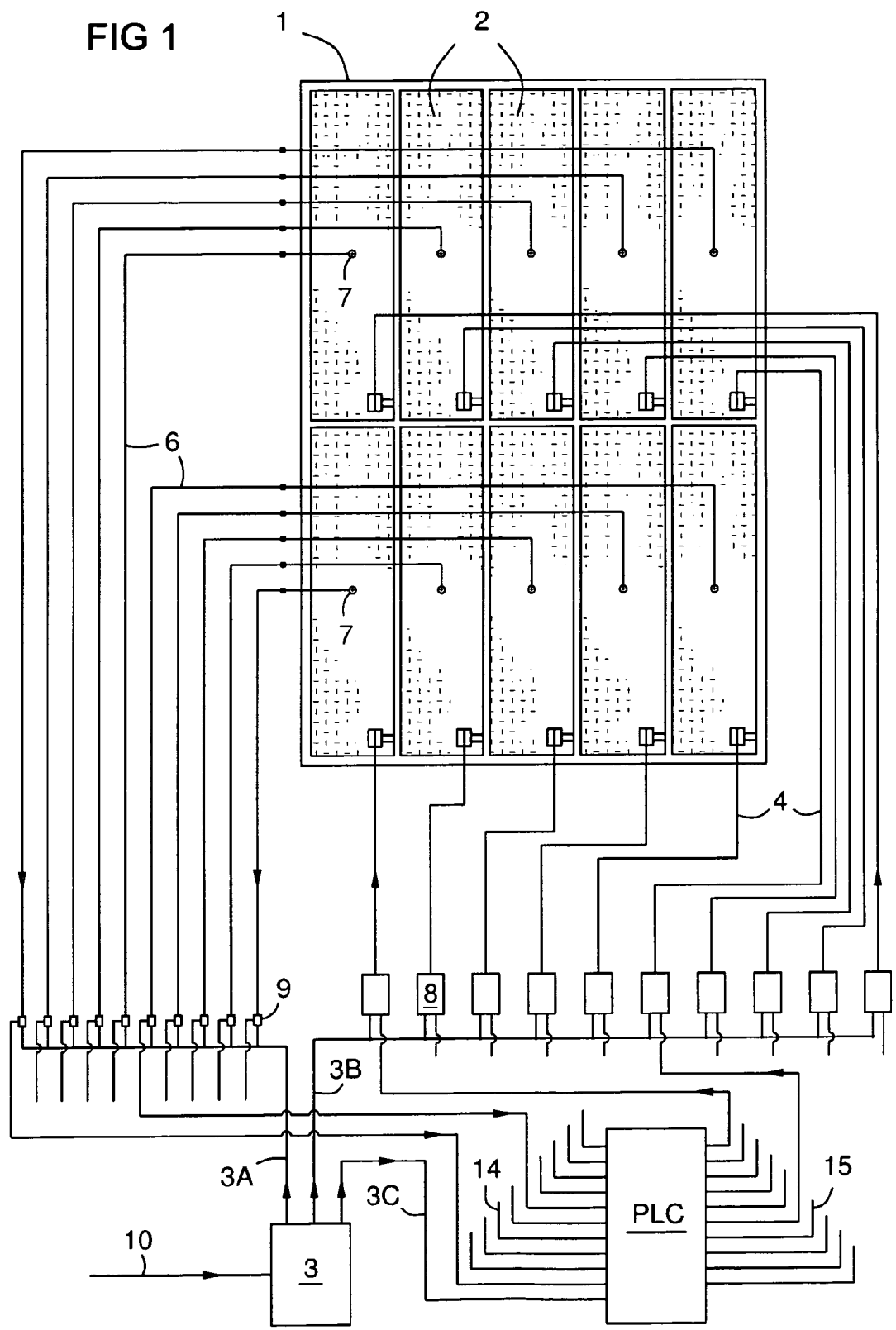
FIG. 1 is a schematic view of a system according to aspects of the invention.

PLC Electric current controller such as a Programmable Logic Controller
1. Area of a lawn being treated
2. Heat blanket
3. Power conditioner and distribution panel
3A. Power bus for temperature sensors (if the sensors are powered)
3B. Power bus for circuit and relay for each blanket
3C. Power bus for PLC
4. Power circuit to each blanket
5. Electric current measuring meter with signal output
5A. Signal output of electric current measuring meter to PLC
6. Temperature sense line from each blanket or ground under blanket
7. Temperature sensor
8. PLC-controlled power relay to each blanket
9. Temperature signal input point from each blanket
10. System power line from generator or electric utility
11. Electrically heated layer of blanket
12. Insulation layer of blanket
13. Weather resistant layer of blanket
14. PLC input lines from temperature sensors
15. PLC output lines to relays for power control to each blanket
16. Optional input device on PLC

DETAILED DESCRIPTION

FIG. 1 illustrates a schematic layout of aspects of the invention using electric heat blankets 2 to heat a soil surface area 1 to a sufficient temperature for a sufficient duration to kill nematodes below the surface. A power conditioner and distribution panel 3 receives power from a generator or a utility, and converts it to the types of current and voltages required by the electrical elements of the system. It provides these currents on one or more busses 3A, 3B, and 3C. Due to the substantial wattage required to heat a lawn-sized area of soil a power management system and method is provided by an electric current control device such as a programmable logic controller or PLC.

A Programmable Logic Controller (PLC) is an electronic device that implements one or more algorithms to control one or more electrical elements. It may have input channels for sensors and output channels for actuating devices or other signal receivers. In the present system, programming of a PLC may include installation of algorithms by the PLC manufacturer, and also may include user selection of control options and parameters via an input device 16 such as buttons or switches on the PLC and/or an electronic interface for a computer. The PLC may optionally include a computer interface such as a universal serial bus to display status information on, and receive control options from, an appropriately programmed personal computer.

In order to limit the maximum power consumption, the heat blankets may be configured in an array of sections 2 as in illustrated in FIG. 1, and their power consumption may be controlled in sections of one or more blankets. This may be done with a temperature sensor 7 such as a thermocouple or thermistor on or under each heat blanket, providing a temperature input to a controller such as a PLC for the system. For convenience and speed of application, each temperature sensor 7 can be attached to the upper or lower surface of a blanket 2 or inside the blanket. The PLC controls which heat blankets are activated, and allows the activated heat blankets to reach approximately 177° C. (350° F.). Once this temperature is reached by a first active subset of blankets (one or more active blankets) the wattage requirement of the first active subset of blankets can be reduced, because only a maintenance amount of heat is required. The PLC then reduces current to the first active subset of blankets to the maintenance level. This allows the PLC to activate additional heat blankets. Depending on the available electrical supply, more blankets can be activated over time as wattage demands drop on the active blankets. When a blanket has been active the requisite period, it will be turned off by the PLC and allowed to cool. Over a period of days, depending on the number of blankets and the available power, all the heat blankets in the infested area are cycled through a full heat cycle, thus heating the complete area to exterminate the nematodes living there.

Figure 2:
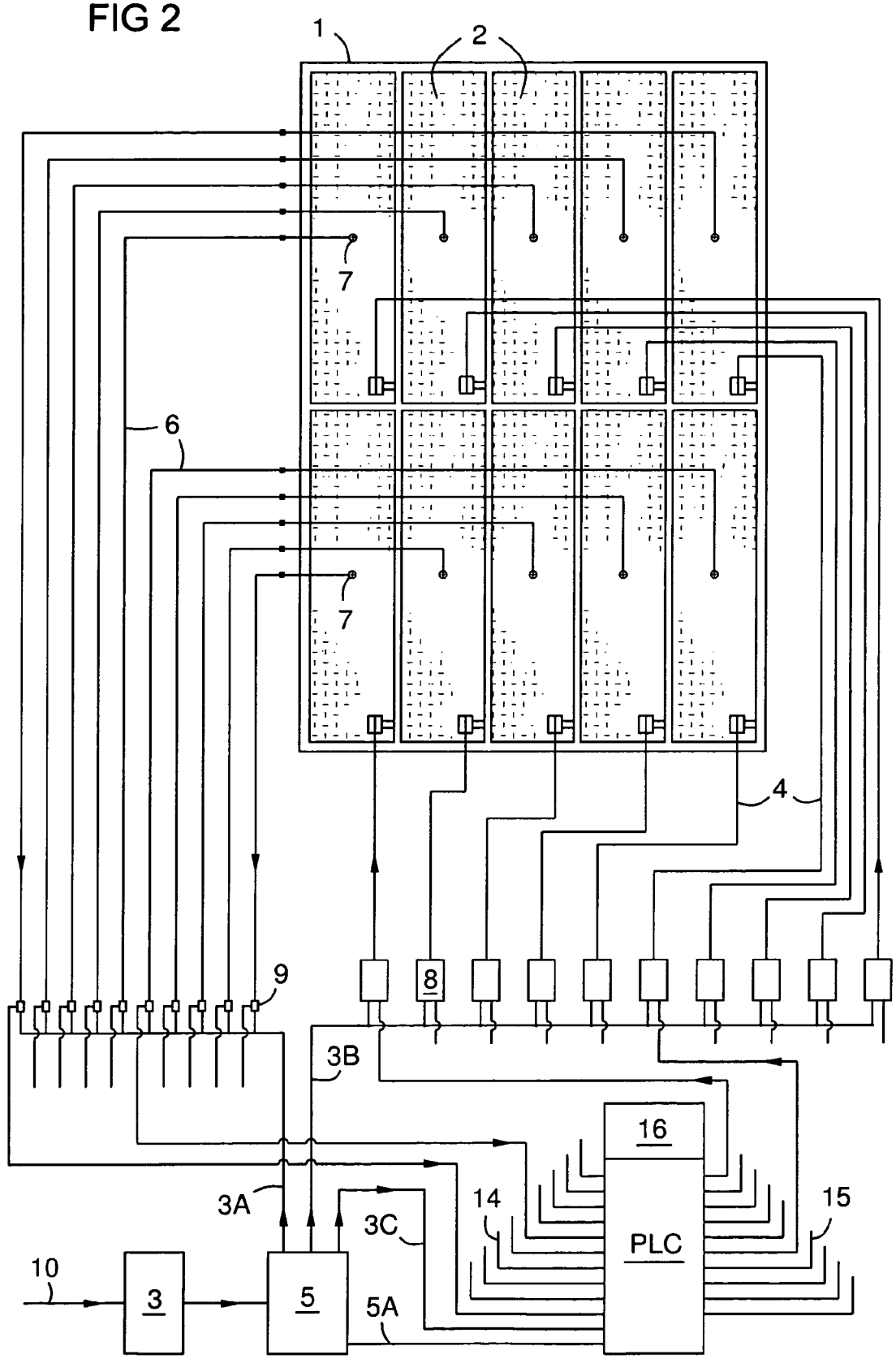
FIG. 2 is a schematic view of a system according to additional aspects of the invention.
Figure 3:
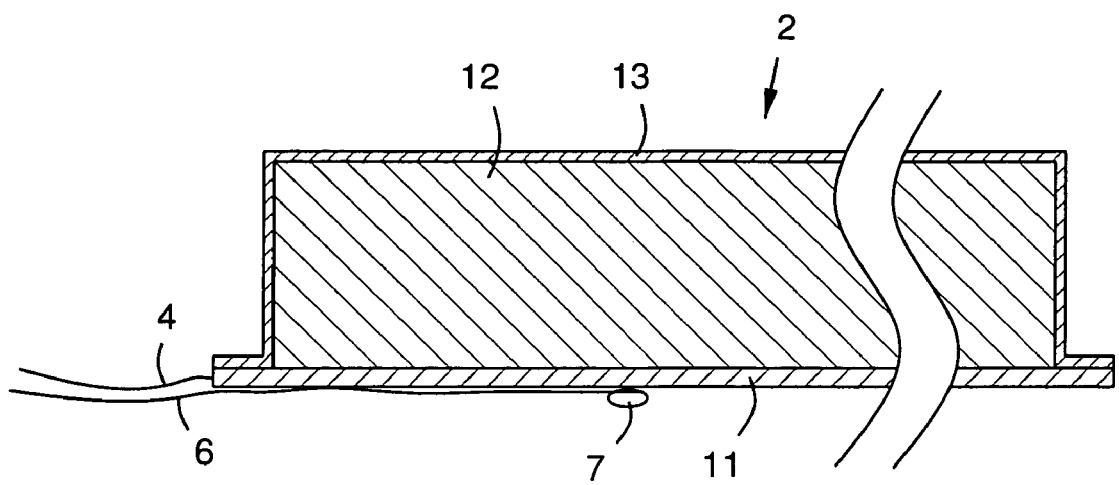
FIG. 3 is a sectional view of a heat blanket.

In an embodiment of the system illustrated in FIG. 2 an electric current measuring meter 5 monitors the total current load from the active blankets, and provides a proportional input signal 5A to the electric current controller or PLC. This signal supplies the PLC an electric load parameter for the control algorithm, so the PLC can maintain a maximum pace of blanket activation without overload. This allows maximum overlapping of heat cycles, which reduces total treatment time.

Process

Lay an electric resistance heater 11 directly on the ground. Cover it with a layer of insulation 12 and a layer of water resistant material 13 to minimize heat transfer to the surrounding atmosphere. Allow the heater to warm up and to run for 1 to 2 days to heat the soil to a temperature high enough, approximately 52° C. (125° F.) at a depth of at least approximately 12 cm (4.7 inches), to kill at least most nematodes under the heater. This extermination temperature at depth can be achieved by heating the ground surface to a temperature of about 177° C. (350° F.), and maintaining the surface temperature between about 177° C. (350° F.) and 150° C. (300° F.) with a reduced wattage for a given time period such as 20 to 50 hours. The total time to treat an area depends on the available power and the size of the area.

Current Control Example 1

Figure 4:
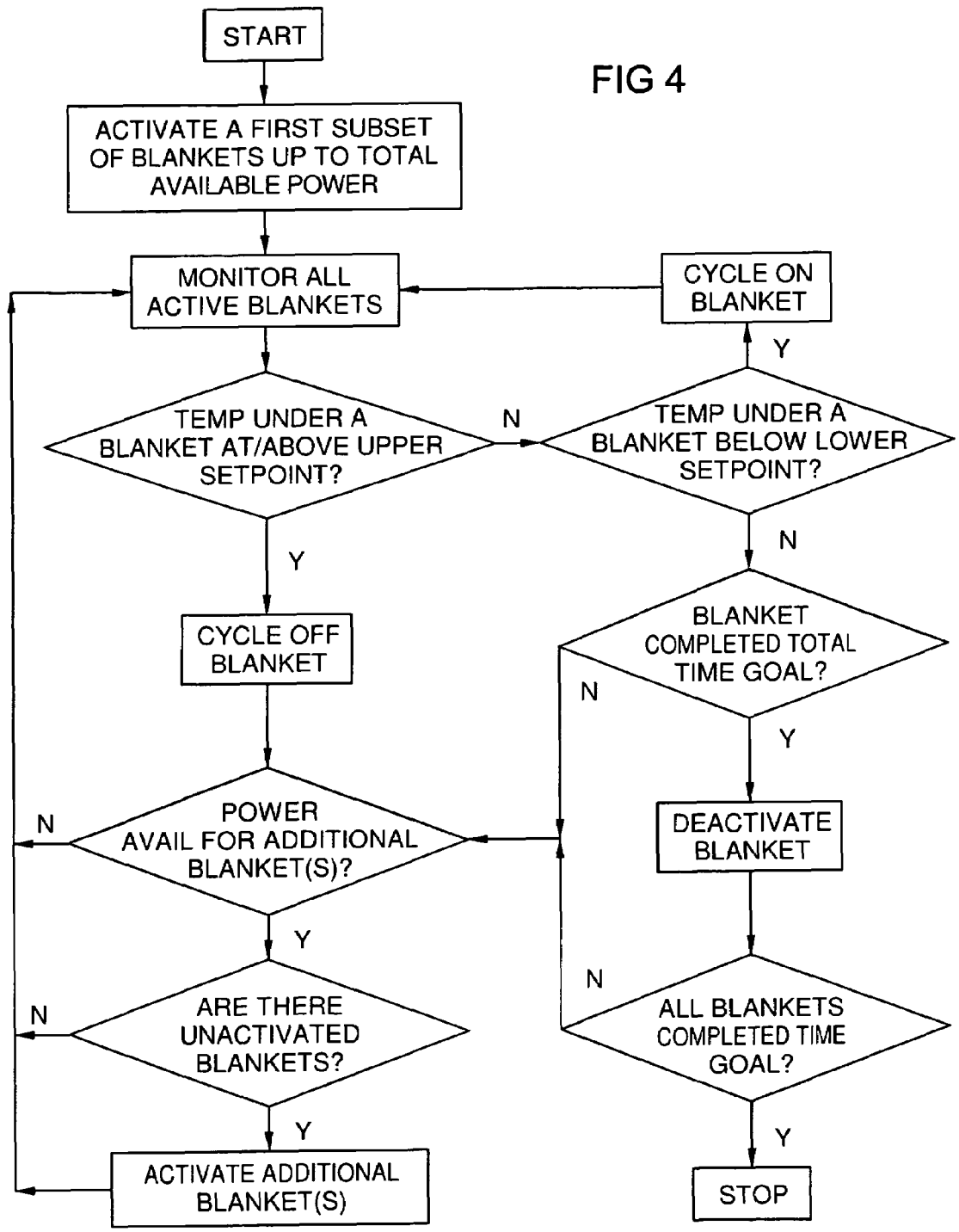
FIG. 4 is a flow diagram of a control algorithm according to an aspect of the invention

The PLC activates current to a first blanket until a set-point of about 177° C. (350° F.) is reached, then it turns off the current to the first blanket. When the first blanket temperature drops below a given low value, such as 150° C. (300° F.), it applies current again. The temperature range between the low high values is a desired temperature range for a blanket. The first "on" cycle is longest because the ground is cold. As the ground becomes warmer, each successive "off" cycle becomes longer. After an hour or so, enough "off" time is available to start another blanket during the "off" time of the first blanket. An algorithm in the PLC such as basically illustrated in FIG. 4 allocates current to the maximum number of blankets that can be operated concurrently within the acceptable temperature range. The number of concurrent blankets depends on the available current and the cycle times experienced. The cycle durations depend on the soil type and condition and starting temperature. Several blankets can be kept hot without drawing more current than is available. If there is enough current, more than one "on" cycle can be active concurrently, so multiple blankets can be started at once.

Current Control Example 2

Another method is pulse width modified (PWM) control. Alternating current is rectified into direct current, which is time-sliced into segments or pulses by the PLC. For maximum heating the current is continuous. If less current is required pulses are spaced with gaps in a percentage that is proportional to the need. Each pulse and gap can be more or less than a second in duration, depending on the controller and the current required at a given time. With this method the controller works constantly and maintains an accurate set-point, such as 177° C. (350° F.). Instead of big changes in current that average to a lower value, the current ramps gradually down to lower levels as needed.

System Advantages
1) Effectively exterminates of nematodes in the root zone of lawn grasses and garden soils
2) Relatively quick results
3) Energy efficient
4) No chemicals or pesticides required
5) Works any time of year
6) Shaded areas of the lawn have no effect on performance
7) Portable
8) Scalable to larger plots of land
9) No moving parts
10) Does not damage sprinkler pipes or other underground utilities
11) Can be used around underground obstructions such as tree or bush roots
12) Can be used around surface obstructions In tests of this invention nematode populations at initially damaging levels were reduced to non-damaging levels. In these tests the University of Florida Nematode Assay Lab noted the reduction in threat from a #1 or #2 level down to the #3 level which is the lowest threat number the lab recognizes. The tests indicated that 1-2 days of heat is normally sufficient to kill most nematodes, depending on the soil type and condition.

Although the present invention has been described herein with respect to preferred embodiments, it will be understood that the foregoing description and drawings are intended to be illustrative, not restrictive. Modifications of the present invention may occur to those skilled in the art.

I claim:

1. A method for nematode extermination in soil, comprising:
providing a plurality of electric heat blankets, each blanket comprising an upper surface, a lower surface, and a thermal insulating layer on the upper surface of the respective heat blanket;
providing an electric power circuit connected to each blanket for energizing the respective blanket;
providing a temperature sensor in, on, or below each blanket that measures the temperature of the respective blanket;
providing an electric current control device that receives the temperature of each blanket from the respective sensor and controls the power circuits to reach a desired temperature range in a first subset of the blankets up to a total available current load, then reduces the current provided to the first subset of the blankets to maintain the desired temperature range in the first subset of blankets while similarly controlling additional of the plurality of blankets until each of the plurality of blankets has been maintained within a desired temperature range for a desired period of time;

placing the heat blankets on a surface area of soil; and energizing each heat blanket to achieve a first temperature range of approximately 150° C. (300° F.) to 200° C. (392° F.) for a first period of time of approximately 20 to 50 hours in each heat blanket in order to obtain a second temperature of at least 52° C. (125° F.) at a given soil depth of at least 12 cm (4.7 inches) for a second period of time that is effective for killing at least most nematodes in the soil under each heat blanket.

2. A method for nematode extermination in soil, comprising:

providing a plurality of electric heat blankets, each blanket comprising an upper surface, a lower surface, and a thermal insulating layer on the upper surface of the respective heat blanket;

providing an electric power circuit connected to each blanket for energizing the respective blanket;

providing a temperature sensor in, on, or below each blanket that measures the temperature of the respective blanket;

providing an electric current control device that receives the temperature of each blanket from the respective sensor and controls the power circuits to reach a desired temperature range in a first subset of the blankets up to a total available current load, then reduces the current provided to the first subset of the blankets to maintain the desired temperature range in the first subset of blankets while similarly controlling a second subset of the plurality of blankets until each of the plurality of blankets has been maintained within a desired temperature range for a desired period of time;

placing the heat blankets on a surface area of soil;

energizing each heat blanket to achieve a first temperature range of approximately 150° C. (300° F.) to 200° C. (392° F.) for a first period of time of approximately 20 to 50 hours in each heat blanket in order to obtain a second temperature of at least 52° C. (125° F.) at a given soil depth of at least 12 cm (4.7 inches) for a second period of time that is effective for killing at least most nematodes in the soil under each heat blanket;

defining the first subset of heat blankets comprising at least one blanket, the first subset of heat blankets comprising a total power load up to, but not exceeding, the total available current load;

energizing the first subset of heat blankets to reach the first temperature range in the first subset of heat blankets;

maintaining the first temperature range in the first subset of heat blankets with reduced current;

energizing the second subset of heat blankets within the total available current load while the maintaining step is in progress; and further maintaining each blanket of the first and second subsets within the first temperature range until each blanket of the first and second subsets has been maintained in the first temperature range for the first period of time.

\* \* \* \* \*